United States Patent [19]

Waldherr

[11] Patent Number: 5,400,521
[45] Date of Patent: * Mar. 28, 1995

[54] LOCKING MECHANISM FOR RETRACTABLE TAPE

[76] Inventor: Arthur Waldherr, 201 Freeport Dr., Bloomingdale, Ill. 60108

[*] Notice: The portion of the term of this patent subsequent to Sep. 21, 2010 has been disclaimed.

[21] Appl. No.: 24,357

[22] Filed: Mar. 1, 1993

Related U.S. Application Data

[63] Continuation-in-part of Ser. No. 840,830, Feb. 25, 1992, Pat. No. 5,245,761.

[51] Int. Cl.⁶ ............................................. G01B 3/10
[52] U.S. Cl. .................................... 33/767; 242/385.4
[58] Field of Search .............. 33/767; 242/84.8, 86.63, 242/86.64, 86.7, 99, 107.12, 107.15, 107.2, 107.3, 107.4 R, 107.6

[56] References Cited

U.S. PATENT DOCUMENTS

| | | | |
|---|---|---|---|
| 2,151,130 | 3/1939 | Mattsson et al. | 33/767 |
| 2,777,204 | 1/1957 | Graves | 33/471 |
| 4,205,448 | 6/1980 | Asai | 33/767 |
| 4,765,557 | 8/1988 | Kahmann | 33/767 |
| 4,856,726 | 8/1989 | Kang | 33/767 |
| 4,903,912 | 2/1990 | Coughlin | 33/767 |
| 4,998,356 | 3/1991 | Chapin | 33/767 |
| 5,245,761 | 9/1993 | Waldherr | 33/767 |

FOREIGN PATENT DOCUMENTS

| | | | |
|---|---|---|---|
| 0531570 | 3/1993 | European Pat. Off. | 33/767 |
| 3414763 | 10/1985 | Germany | 33/769 |

Primary Examiner—Thomas B. Will
Attorney, Agent, or Firm—Emrich & Dithmar

[57] ABSTRACT

A retractable tape measure having a housing with an opening therein through which a portion of the tape extends with the remainder of the tape being coiled around a spring biased reel having a hub around which the tape is coiled. Opposed annular ends on the hub retain the tape coiled therearound. One of the annular ends has a serrated circular peripheral edge with about 100 to about 150 serrations. A first locking mechanism is shiftably mounted on the housing movable vertically into and out of engagement with the tape. Second locking mechanism is shiftably mounted on the housing movable radially into and out of engagement with the serrated edges. The second locking mechanism has a plurality of serrations thereon which when engaged with a plurality of serrations on each annular end provide a positive lock for the tape coiled around the reel hub to prevent further withdrawal of the tape. The second locking mechanism may be spring biased.

20 Claims, 5 Drawing Sheets

LOCKING MECHANISM FOR RETRACTABLE TAPE

RELATED APPLICATIONS

This application is a continuation-in-part of U.S. patent application Ser. No. 840,830, filed Feb. 25, 1992, now U.S. Pat. No. 5,245,761.

BACKGROUND OF THE INVENTION

The present invention relates to a positive stopping device for a tape measure. In conventional tape measures, a frictional engagement or pressing means has been provided at a side of the tape measure body and stopping of the tape measure has been carried out by pressing the stopping means into frictional engagement with the marked face of the measure or tape. After repeated uses, there is a possibility that the measuring indicia can be wiped from the face of the tape and even if this does not occur, the stopping means is not positive in the sense that there is only a frictional engagement which makes movement of the tape measure somewhat more difficult but does not provide any kind of actual positive locking mechanism for the tape measure.

There are a variety of patents which have issued some recently and some not so recently which show mechanism for positively stopping a tape measure but all of these devices fail to provide the type of control necessary for carpentry uses or require expensive mechanisms to modify standard tape measures. For instance, the Kang U.S. Pat. No. 4,856,726 issued Aug. 15, 1989 shows a stopping device for a tape measure wound on a spool or reel but the device is adaptable only to a large tape measure device and requires an expensive interrupt mechanism to be added onto the casing of the tape measure, the entire combination being much too clumsy and much too large to be incorporated into the standard tape measure of the type commonly sold at hardware stores for carrying on a carpenter's belt or useful around the house. Moreover, the tape measure cannot be stopped at small intervals.

U.S. Pat. No. 4,531,688 issued to Gail Jul. 30, 1985, also shows a positive stopping mechanism for a measuring tape. In the Gail device, an entirely new spool has to be designed in order to accommodate what is essentially a clutch device wherein the clutch has to move axially with respect to the drum. This device, while perhaps satisfactory, involves the kind of moving parts which can cause difficulty when a tape measure is subjected to kinds of abuse encountered in the field when used by construction carpenters. It also requires a relatively complex mechanism in comparison to the invention hereinafter disclosed. In addition, the tape measure cannot be stopped at small intervals.

Other patents of general interest include the Buttigieg U.S. Pat. No. 2,071,225 issued Feb. 16, 1937 and the Gasstrom U.S. Pat. No. 2,080,815 issued May 18, 1937, both for measuring tape devices. Neither of these patents show the kind of stopping mechanism which is the subject of the invention, that is a positive locking mechanism which is capable of locking the measuring tape at 1/16 to ⅛ inch intervals and which requires no actual moving parts but relies instead on a simple straight forward device which nevertheless provides the positive interlock needed by carpenters and the like.

In addition, Lyon U.S. Pat. No. 569,792; Brunello U.S. Pat. No. 655,052; Hance U.S. Pat. No. 1,232,299; Mattsson et al. U.S. Pat. No. 2,151,130; and Gravert U.S. Pat. No. 4,123,753 were cited by the Examiner in the parent application.

OBJECTS OF THE INVENTION

Accordingly, it is an object of the invention to provide a positive locking mechanism for a measuring tape which fixes the tape with respect to the housing in increments of about 1/16 inch.

Another object of the invention is to provide a positive locking mechanism for a measuring tape where the stop mechanism engages and disengages without having to slide with respect to each other.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
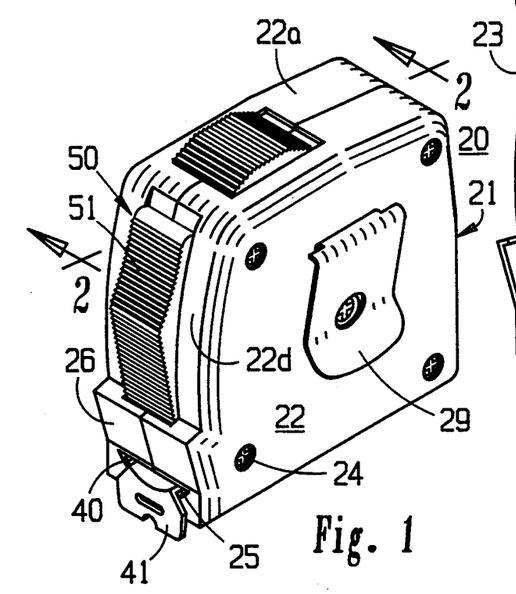
FIG. 1 is a perspective view of a tape measure incorporating the subject invention wherein the tape is coiled within the housing.
Figure 2:
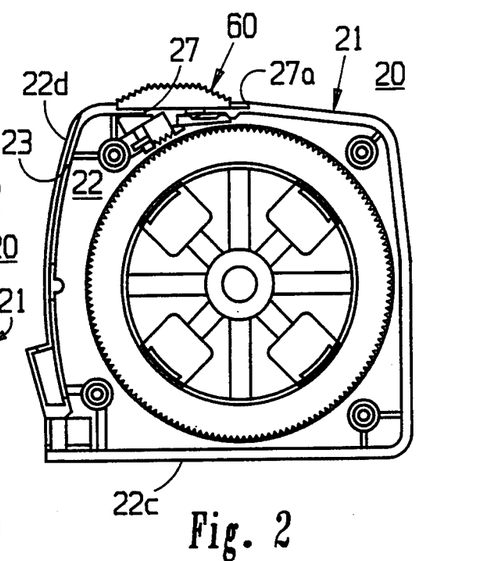
FIG. 2 is a sectional view of the tape measure illustrated in FIG. 1 as seen as along line 2—2 thereof with the positive locking mechanism in the unlocked position.
Figure 3:
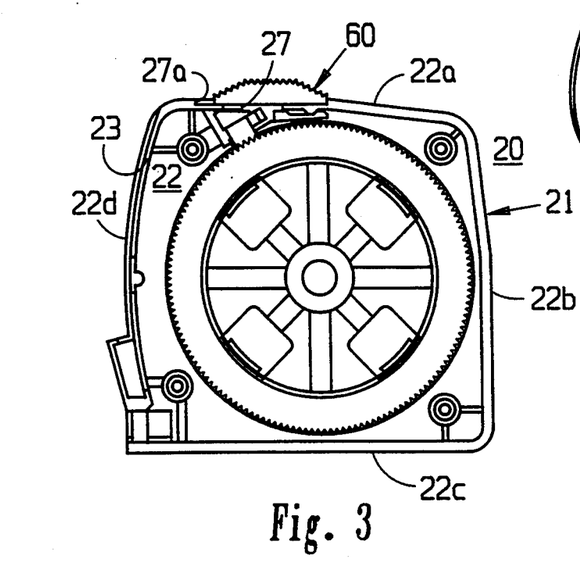
FIG. 3 is a view like a portion of FIG. 2 with the positive locking mechanism of the subject invention in a locked position.
Figure 4:
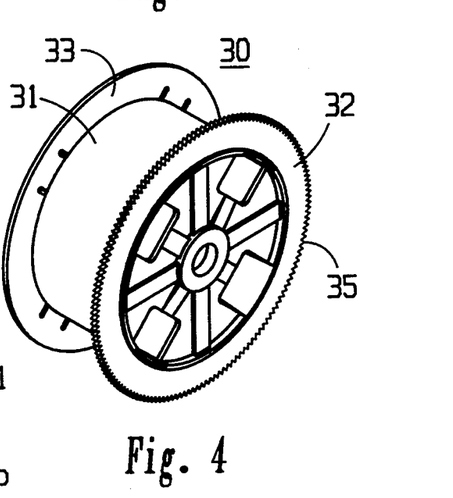
FIG. 4 is a perspective view of the spool or reel of the subject invention showing the serrations or teeth on the spool or reel rim.
Figure 5:
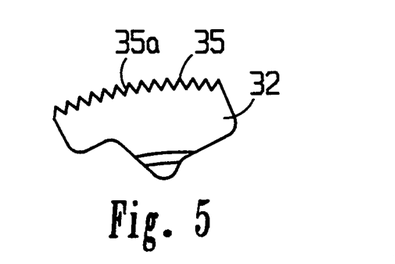
FIG. 5 is an enlarged view of the teeth or serrations on the spool rim illustrated on FIG. 4.
Figure 6:
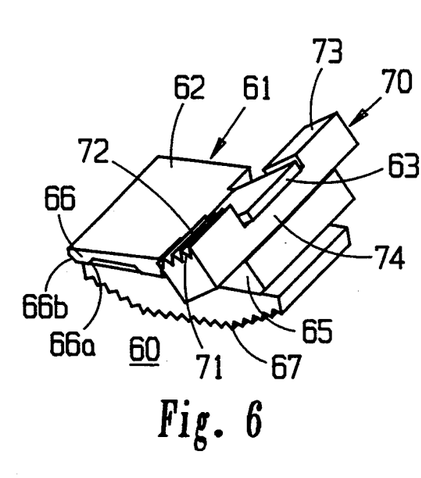
FIG. 6 is a perspective view of the locking mechanism of the present invention, particularly that illustrated in FIGS. 1 through 5.
Figure 7:
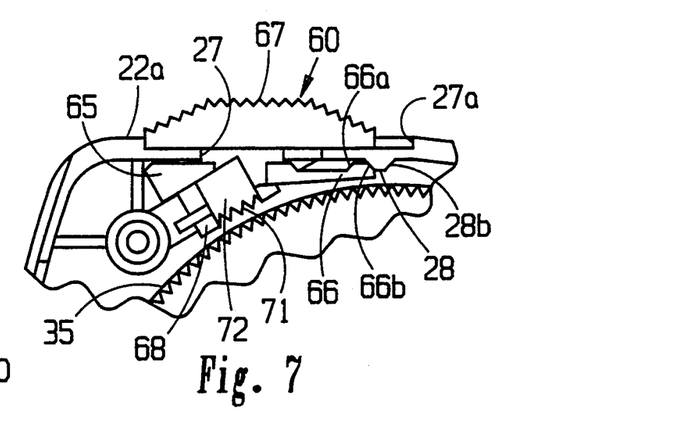
FIGS. 7 and 8 are side elevational views of the locking mechanism respectively in the unlocked and locked positions thereof.
Figure 8:
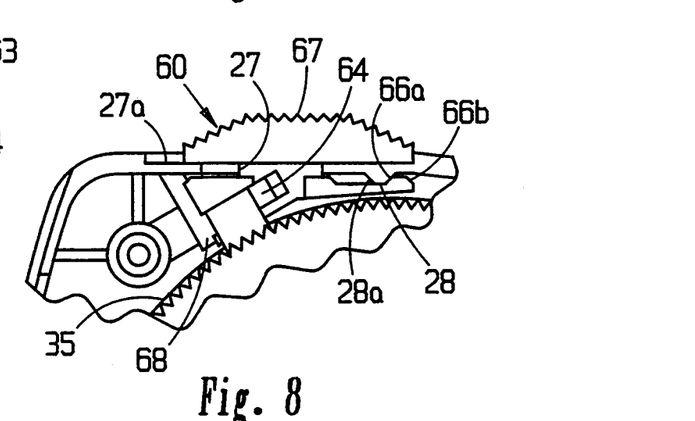

Referring now to FIGS. 1-8 of the drawings, there is disclosed a tape measure 20 of the conventional type including a housing 21 having opposed side panels 22 meeting at a parting line along the top 22a, the back 22b, bottom 22c and front 22d. The housing 21 is held together by a plurality of screws 24 in the usual manner and has an opening 25 in the front panel 26 of the housing through which the tape 40 protrudes, the tape having a tab 41 which prevents the tape 40 from being drawn completely into the housing by a torsion spring, not shown. The housing 21 further includes a top opening 27 and an opening 23 in the front, both the top opening 27 and the front opening 23 being for actuators as hereinafter to be explained. A ledge 27a is recessed in the top 22a and extends from the opening 27 for a purpose hereinafter set forth. As best seen in FIGS. 7 and 8, a detent 28 extends downwardly from the inner surface of top 22a, the detent 28 having 45° camming surfaces 28a and 28b, as will be explained. A ordinary clip 29 is affixed to one of the side panels 22 to facilitate clipping the tape measure 20 onto a carpenter's belt or the like.

A reel or spool 30 is contained inside the housing 20, rotatably mounted on stub shafts (not shown) on each of the side panels 22 of the housing 21, the spool or reel 30 having a hub 31 and opposed circular ends 32 and 33. Each of the circular ends 32 and 33 has an annular portion which has a circular peripheral edge, one of which is provided with a plurality of serrations or teeth 35 therearound. Each of the serrations or teeth 35 is shown in FIG. 5 and includes inclined surfaces 35a. The inclined surfaces 35a are angularly disposed in the range of from about 45° to about 90°, with about 70° being preferred. Preferably there is a 5/1000 radius at the top of each tooth 35 and at the juncture of adjacent teeth 35.

Figure 15:
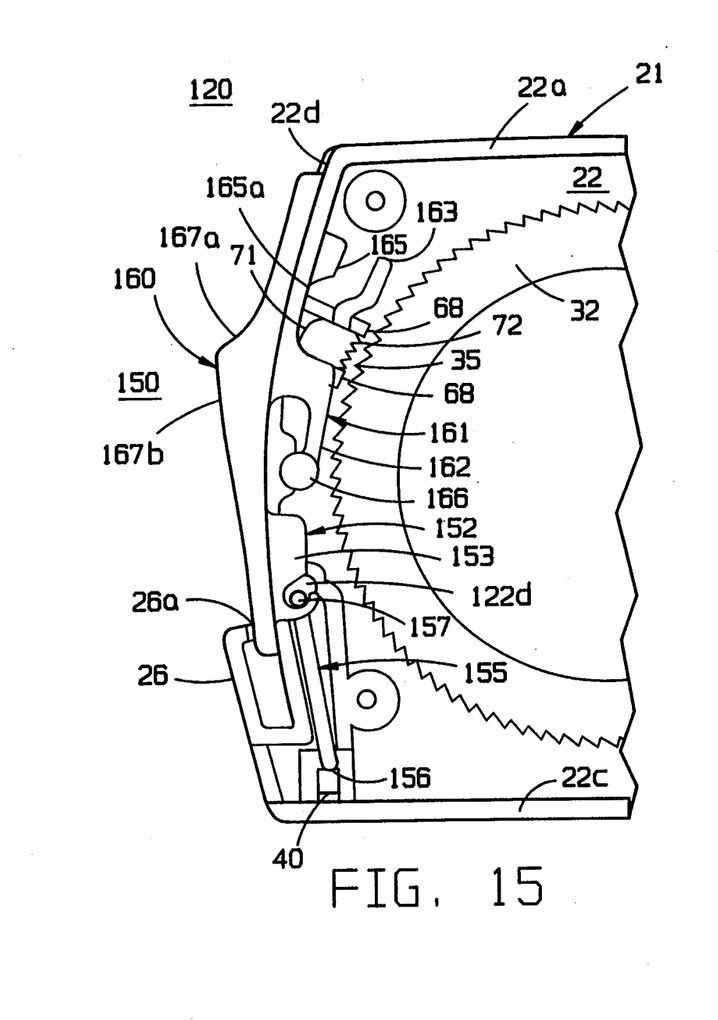
FIGS. 15 to 17 are sectional views of another embodiment of the present invention like FIGS. 2-3 respectively in the open and locked and double locked positions thereof.
Figure 17:
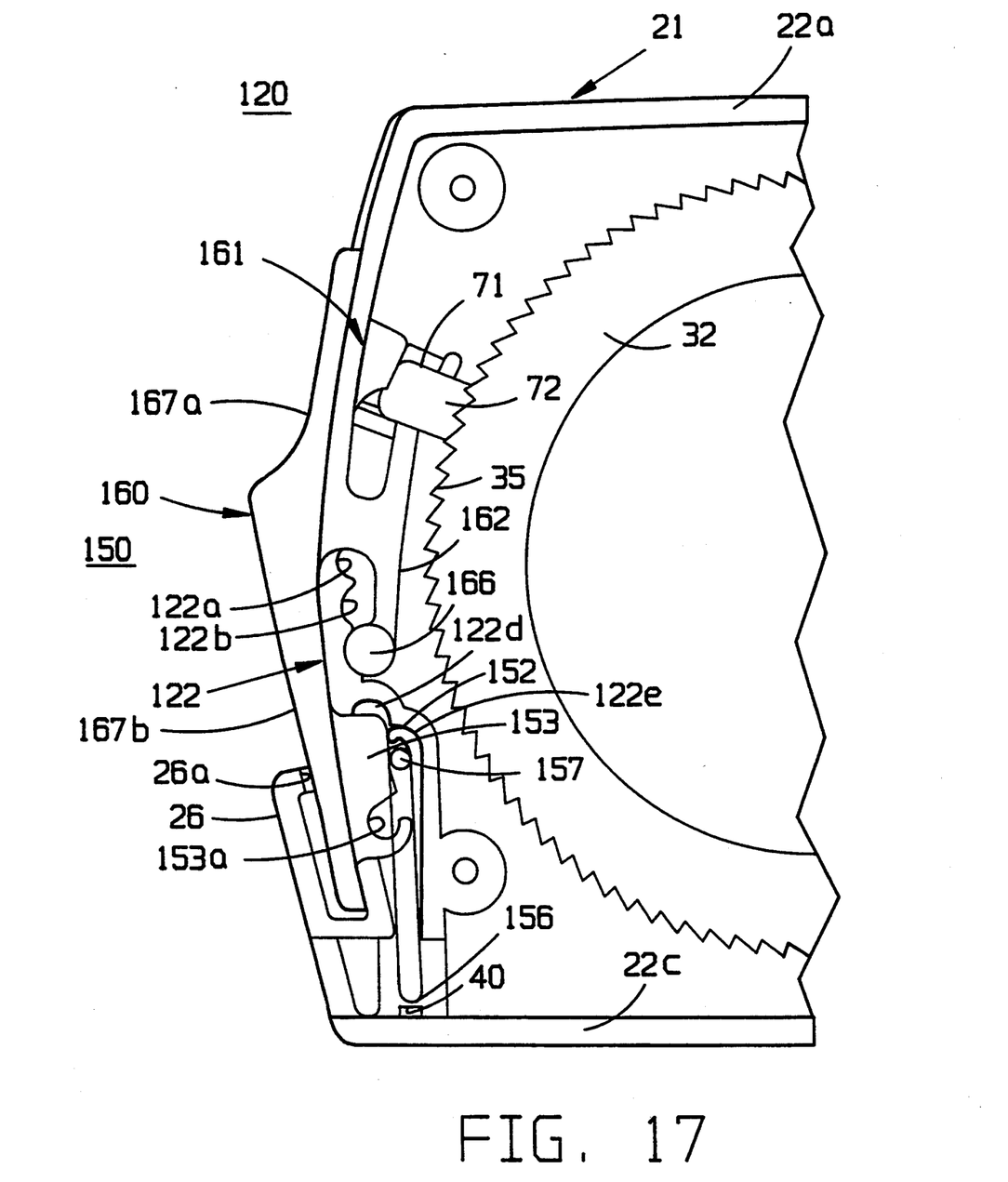

A first locking mechanism 50 includes an actuating member 51 having a ribbed outer surface and being connected to a vertically extending and movable engagement member not shown in FIGS. 1–14 but illustrated in FIGS. 15–17 having a convex curved end portion which is adapted fractionally to engage the flexible measuring tape 40 when the actuator 51 is moved vertically. It should be understood that the first locking mechanism 50 is movable between a retracted position and a extended or locking position which is well known in the art and disclosed in my co-pending application, the specification of which is incorporated by reference.

Figure 9:
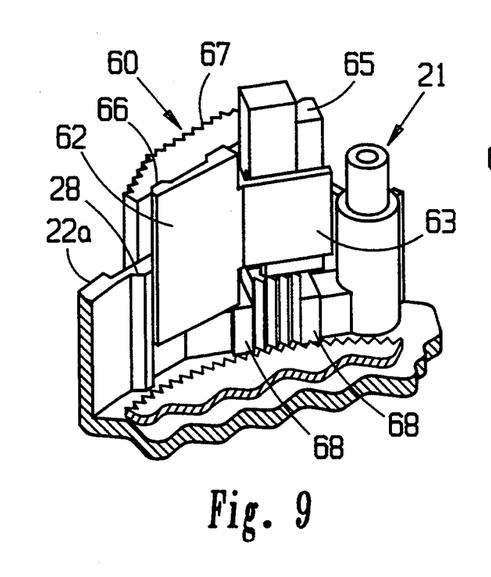
FIGS. 9 and 10 are perspective views of the present invention respectively in the unlocked and locked positions thereof.
Figure 10:
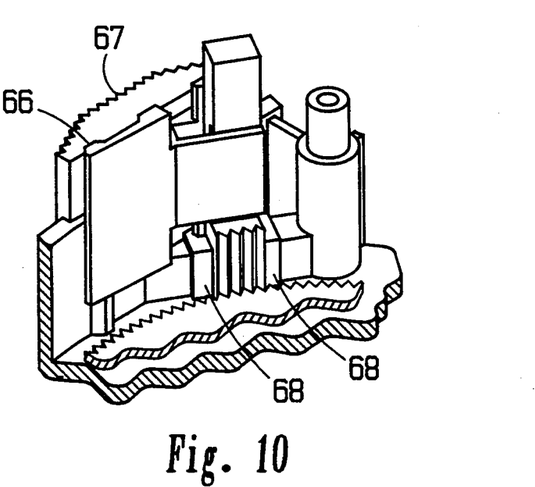

A second locking mechanism 60 is illustrated in FIGS. 2, 3, and 6 through 10 and comprises a fixture 61 which is irregular in shape and includes a flat plate section or portion 62 having an angled tongue 63 depending therefrom and forming a slot 64 between the tongue 63 and a wedge shaped member 65. The flat plate 62 has a free end 66 which is provided with camming surfaces 66a and 66b extending thereacross, for a purpose hereinafter set forth. Integral with the fixture 61 is a ribbed actuator member 67. The fixture 61 slides onto the top 22a when the two halves of the housing 21 are separated. Depending from the bottom surface of the top 22a are a pair of guides 68 which are spaced apart a specified distance to receive therebetween a portion of a lock member 70 having a body portion 71 which includes at one end thereof a plurality of serrations 72 and at the other end thereof either serrations or as shown in FIGS. 6, 9 and 10, a flat portion 73. Between the serrations 72 and the flat or smooth portion 73 is an indented portion 74 which fits into the slot 64 so that when the second locking mechanism 60 is in place, the serrated portions 72 of the body 71 are trapped between the guides 68 and the indented portion 74 is positioned in the slot between the wedge shaped piece 65 and the tongue 63.

Operation of the locking mechanism 60 is particularly illustrated in FIGS. 6–10. Referring now to FIG. 7 wherein the locking mechanism 60 is in the unlocked position thereof with the ribbed actuator 67 moved to the left hand portion of the slot 27a which causes the wedged shaped member 65 to move to the left with the body member 71 moving radially outwardly so that the serrations 72 thereof are spaced from the serrations 35 on the reel or spool 30 and more particularly from the circular end 32. At this point, the free end 66 of the fixture 61 is to the left of the detent 28 and more particularly, the 45° camming surface 66b is in contact with the 45° camming surface 28a. The body 71 moves radially because of the guides 68 which trap the lock member 70 so that it moves in a direction along a radius extending outwardly from the center of the reel or spool 30.

FIG. 8 shows the locking mechanism 60 in the locked position thereof wherein the ribbed actuator 67 has been moved to the right along the ledge 27a such that the camming wedge 65 has moved to the right forcing the lock member 70, the body thereof 71 and the serrations 72 radially toward the center of the spool 30 so that serrations 72 engage with the serrations 35 thereby providing a fixed locked condition or position for the tape measure 20. Further, the free end 66 of the fixture 71 has moved past the detent 28 and particularly the 45° camming surface 68a is now in contact with the 45° camming surface 28b of the detent 28, thereby providing a secure locked position for the locking mechanism 60. As can be seen particularly from FIGS. 7 and 8, the lock member 70 moves radially when the wedge 65 changes positions.

Referring now to FIGS. 11–14, there is disclosed another embodiment of the invention, wherein a locking member 80 which is identical in construction to locking mechanism 60 with the exception that a spring is provided which biases the locking mechanism into the unlocked position thereof. In the locking mechanism 80 like numbers are applied to like parts. The principle difference is that a stop member 81 is provided at the bottom of the top 22a spaced from the guides 68, the stop member 81 being in the form of a U-shaped container but any stop device such as a ledge or a pin would suffice. The other difference is that a spring housing 82 is on the bottom of the fixture 61 which houses a spring 85. The spring 85 being a normal coil spring which stores potential energy when the spring is compressed and releases the energy when it expands.

Figures 11, 12, 13, 14:
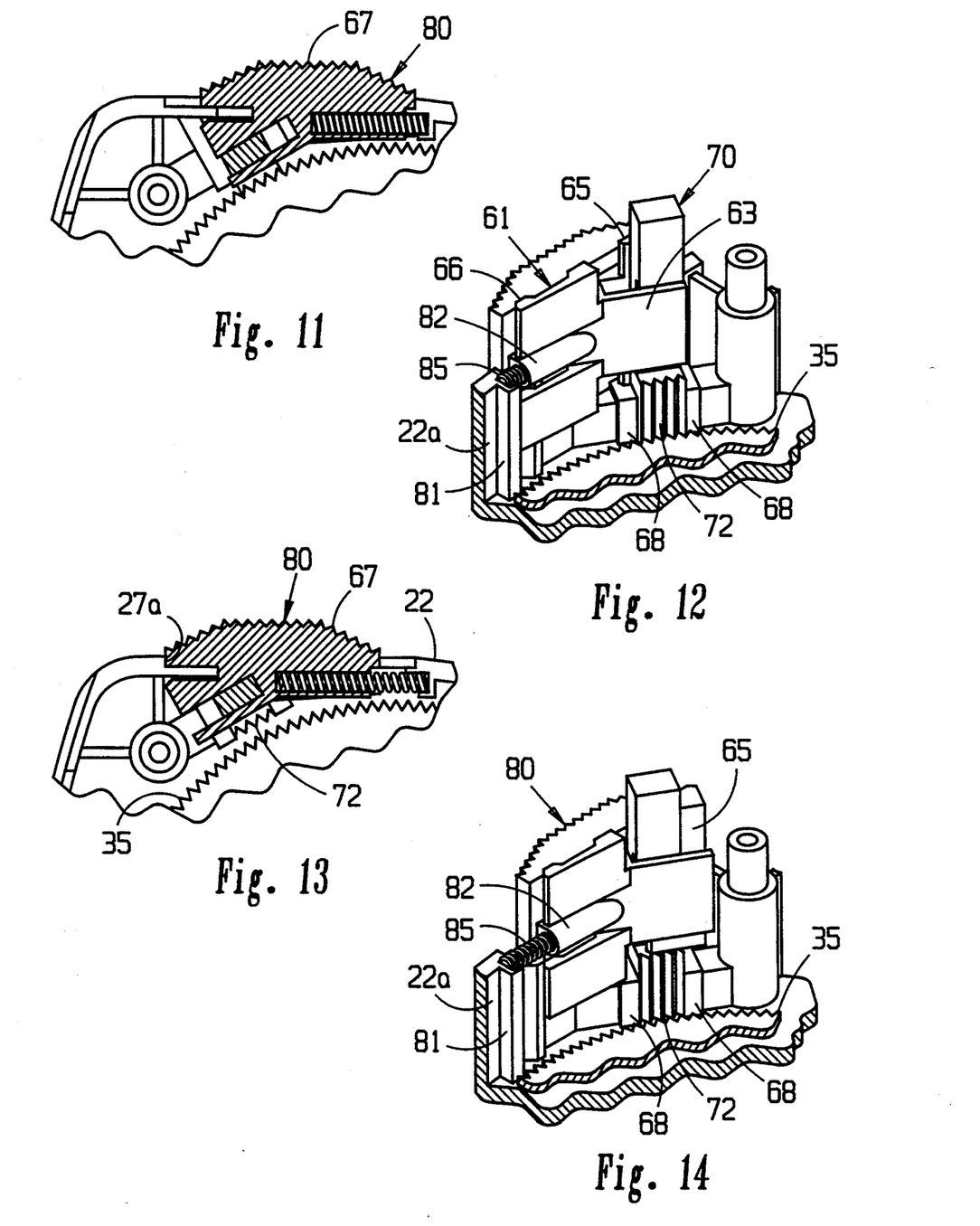
FIGS. 11 and 13 are side elevational views partly in section of an alternative locking mechanism respectively in the locked and unlocked positions thereof.
FIGS. 12 and 14 are perspective views of the alternative locking mechanism respectively in the locked and unlocked positions thereof.

As seen from FIGS. 11–14, the spring 85 is compressed when the locking mechanism 80 is such that the lock member 0 with the serrations 72 is in engagements with the serrations 35 on the spool or reel 30. The spring 85 is in its expended position when the locking mechanism 80 is in its unlocked position as is shown in FIG. 14 wherein the serrations 72 are spaced from the serrations 35 allowing the reel or spool 30 freely to rotate. Otherwise, the operation of the locking mechanism 80 and the locking mechanism 60 are the same. In both embodiments, the serration 72 move in a radial direction between the locked and unlocked positions so as to both form a secure locking arrangement and also to ensure that the serrations or teeth mesh and are not chipped as could otherwise occur if the movement of the serrations 72 and 35 were in a direction other than along a radius.

Further, because there are between about 100 and 150 serrations or teeth 35 around the periphery of the circular end 32 of the reel or spool 30, the tape 40 can be withdrawn and then fixed in increments of about 1/32 of an inch. This is an advantage over the prior art and an advantage not suggested by the prior art. In addition, the provision of teeth or serrations 65 on the locking member 60, 80 which mate and engage the teeth 35 on the spool 30 provides a secure locking mechanism preventing any movement of the tape 40 outwardly from the housing 21 when the locking mechanism is engaged.

Figure 16:
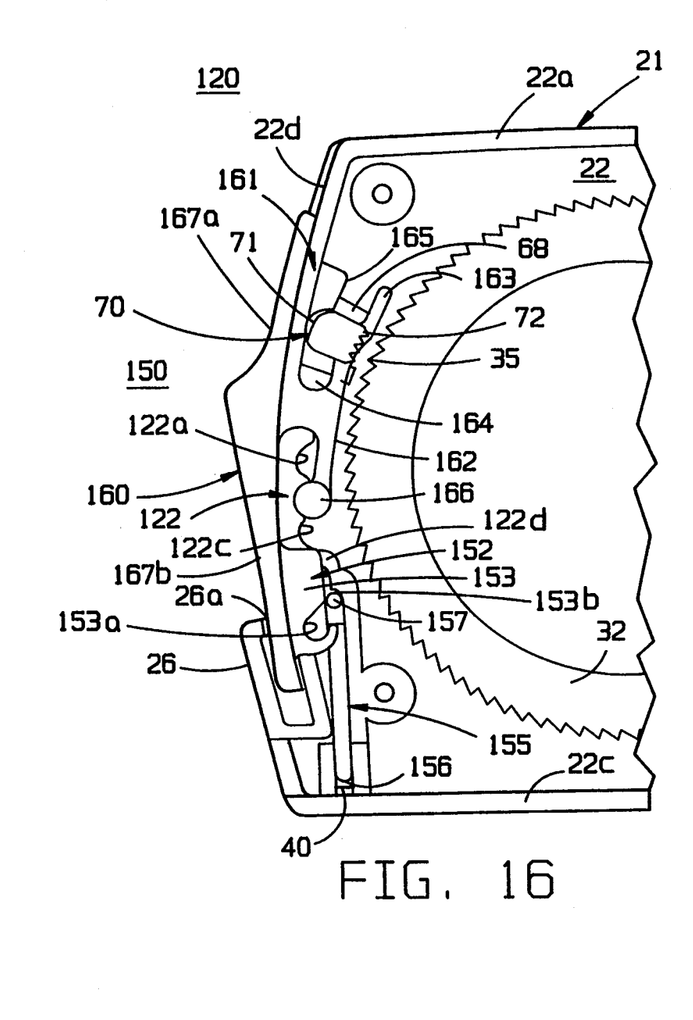

Referring now to the alternate embodiment shown in FIGS. 15-17, wherein like reference numbers have been applied to like parts, there is disclosed a tape measure 120 of the conventional type wherein a combination locking mechanism 150 is mounted on the front 22d of the casing or housing 21. The locking mechanism 150 is a combination of the previously described locking mechanisms 50 and 60 and is located conveniently on the front of the housing 21. The front panel 26 of the housing 21 is provided with an aperture 26a through which extends a portion of an actuating member 160. The actuating member 160 has a curved portion 167a for receiving the user's thumb for assisting in downward movement of the actuator and a portion 167b which has a distal end thereof that extends through the opening 26a in the front panel 26. Integral with the actuator 160 is a fixture 161 which is similar to the fixture 61 of the locking mechanism 60. The fixture 161 is irregular in shape and includes a flat plate section or portion 162 having an angled tongue 163 extending therefrom and forming a slot 164 between the tongue 163 and an abutment member 165 having a shoulder 165a thereon for purposes that will be explained.

A pair of guides 68 extend radially inwardly from the front 22d of the housing 21 and which are spaced apart a specified distance to receive there between the body portion 71 of the lock member 70. The lock member 70 is substantially similar to the lock member of the first embodiment and includes a plurality of serrations 72 on the inwardly-extending end surface thereof. The fixture 161 has a cylindrical bead 166 at the end thereof which rests in one of three positions of a fixture 122 mounted on the inside of the front 22d of the housing 21. The fixture 122 includes three bays or arcuate rests 122a, 122b, and 122c for receiving the cylindrical bead 166 therein.

The locking mechanism 150 also includes a first locking mechanism 155 which is mounted behind the front 26 interior of the housing 21 and has a vertically-extending member having a distal end 156 and a beaded member 157 on the upward end thereof. The actuator 160 has in addition to the fixture 161 another fixture 152 located vertically downwardly from the fixture 161 and also extending inwardly having a body portion 153 and a hook member 153a which is shaped to cooperate with the bead 157 on the frictionally engaging member 155. A shoulder 153b is between the hook member 153a and the body portion 153.

Operation of the second locking mechanism 150 is as follows. In the left or open position illustrated in FIG. 15, the actuator 160 is in the upward-most position. In this position, the bead 166 fits into the receiving portion 122a of the fixture 122 and the shoulder 165a and abutment member 165 on the fixture 161 are spaced away from the body portion 71 of the lock member 70 thereby positioning the lock member 70 in a position such that the serrations 72 thereof are spaced away from the serrations on the circular end 32 of the hub 31 thereby permitting free rotation of the reel or spool 30. Also in the open position illustrated in FIG. 15 the first locking mechanism 155 and particularly the distal end 156 thereof is spaced from the measuring tape 40 to permit free movement of the tape 40 into and out of the housing 21.

In FIG. 16, there is shown an intermediate or locked position of the tape measure 120 wherein the locking mechanism 150 is moved into an intermediate position thereof wherein the actuator 160 has been moved downwardly such that the bead 166 is now housed within the receiving portion 122b of the fixture 122. In this vertical position, the fixture 161 is positioned so that the shoulder 165a of the portion 165 is spaced away from the lock member 70 and the body portion 71 thereof so as to maintain the serrations 72 out of engagement with the serrations 35 on the circular member 32. That is to say that movement of the actuator member 160 from the position illustrated in FIG. 15 to the position illustrated in FIG. 16 does not change the radial position of the lock member 70, which like the first described embodiment is trapped between the guides 68.

However, in FIG. 16 the frictional locking mechanism 155 has been moved from its retracted position as shown in FIG. 15 to engagement position shown in FIG. 16. Although the engagement position shown in FIG. 16 appears not to provide engagement between the distal end 156 of the mechanism 155 on the tape 40, the measuring tape 40 naturally has a convex shape (as is well known) and therefore contacts the distal end 156 of the mechanism 155 in the position shown in FIG. 16. In the position shown in FIG. 16, the fixture 152 which in the position of FIG. 15 has the bead 157 supported by contact with the arcuate portion 153a of the fixture body 153 so as to maintain the mechanism 155 out of contact with the measuring tape 40, has been moved downwardly so that the hook member 153a of the fixture body 153 is out of engagement with bead 157. Moreover, the shoulder 153b is now in contact with the bead 157 and has forced the mechanism 155 and particularly the distal end 156 thereof into frictional engagement with the tape 40. In the position shown in FIG. 16 the tape 40 is frictionally held in any extended position but is easily moved by the user from one position to another, but the force exerted by the frictional engagement between the distal end 156 and the tape 40 is sufficient to overcome the spring which usually retracts the tape 40, thereby preventing the tape from being withdrawn automatically when the user releases the tape 40.

Referring now to FIG. 17, the embodiment 120 is shown in its fully locked position wherein the actuator 160 has been moved vertically downwardly such that the bead 166 now rests within the portion 122c of the fixture 122. In moving to this position, the shoulder 165a contacts the body portion 71 of the lock member 70 and forces it radially inwardly such that the serrations 72 engage the serrations 73 and the abutment portion 165 maintains the body portion 71 in fixed contact in the position as illustrated so as to positively lock the spool or reel 30 from rotation. The fact that the bead 166 is received into the arcuate portion 122c helps to maintain the locking mechanism 150 in this position against an attempt to move the tape 40 from the position in which it has been locked.

At the same time, downward movement of the actuator 160 has no effect on the position of the member 155 since the shoulders 122d and 122e do not move since they are a part of the fixture 122 which is mounted to an extension of the front 22d of the housing. On the other hand, the camming action of the fixture 152 which has moved the member 155 downwardly from the position illustrated in FIG. 15 to the position illustrated in FIG. 16 by contact of the bead 157 with the body portion 153 of the fixture 152 is in fundamentally the same position in FIGS. 16 and 17; that is, the mechanism 155 is still in frictional contact at the end 156 thereof with the tape 40.

As can be seen from the embodiment shown in FIGS. 15 to 17, the location of the two locking mechanisms on the front of the housing 22a is convenient in that a single actuator member 160 is sufficient to engage both the frictional lock and the permanent lock with the tape 40 and the mechanism internal of the housing 21. Moreover, with this preferred construction the three positions illustrated in FIGS. 15–17 are possible, thereby providing a superior tape measure 120.

While there has been disclosed what is considered to be the preferred embodiment of the present invention, it is understood that various changes in the details may be made without departing from the spirit, or sacrificing any of the advantages of the present invention.

I claim:

1. A retractable tape measure having a housing for a flexible measuring tape and an opening in the housing through which a portion of the tape extends with the remainder of the tape being coiled around a spring biased reel having a hub around which the tape is coiled and opposed annular ends on said hub retaining said tape coiled therearound, one of said annular ends having a circular peripheral serrated edge with about 100 to about 150 serrations, locking mechanism shiftably mounted on said housing movable radially into and out of engagement with said serrated edge, said locking mechanism having a plurality of serrations thereon which when engaged with a plurality of said serrations on said one of said annular ends provides a positive lock for said tape coiled around said reel hub to prevent further withdrawal of the tape from said housing and means for maintaining said locking mechanism in engagement with said serrated edge.

2. The retractable tape measure of claim 1, wherein the serrations of said locking mechanism are of the same size as the serrations on said one of said annular ends.

3. The retractable tape measure of claim 2, wherein at least three of said serrations of said one annular end and said locking mechanism are in engagement when said locking mechanism is in locked engagement with said serrations on said annular end.

4. The retractable tape measure of claim 1, wherein said locking mechanism is slidably mounted on said housing.

5. The retractable tape measure of claim 4, wherein said locking mechanism is mounted on the top of said housing.

6. A retractable tape measure having a housing for a flexible measuring tape and an opening in the housing through which a portion of the tape extends with the remainder of the tape being coiled around a spring biased reel having a hub around which the tape is coiled and opposed annular ends on said hub retaining said tape coiled therearound, one of said annular ends having a serrated circular peripheral edge with about 100 to about 150 serrations, and a locking mechanism shiftably mounted on said housing movable into and out of engagement with said serrations on said reel, said locking mechanism including a fixture having a wedge shaped cam and a serrated member movable radially, by sliding movement of said wedge shaped cam, into and out of contact with the serrated reel, whereby when said locking mechanism is engaged further uncoiling of the measuring tape is prevented as said reel is locked against rotation.

7. The retractable tape measure of claim 6, wherein the serrations are teeth having a pitch in the range of from about 70° to about 90°.

8. The retractable tape measure of claim 7, wherein the teeth have a pitch of about 70°.

9. The retractable tape measure of claim 6, and further comprising a spring biasing said locking mechanism to the unlocked position thereof.

10. The retractable tape measure of claim 6, wherein the housing has a top wall having an aperture therein in which said locking mechanism is mounted.

11. The retractable tape measure of claim 10, wherein guide means extends from the housing top to restrict movement of said locking mechanism serrated member radially.

12. A retractable tape measure having a housing for a flexible measuring tape and an opening in the housing through which a portion of the tape extends with the remainder of the tape being coiled around a spring biased reel having a hub around which the tape is coiled and opposed annular ends on said hub retaining said tape coiled therearound, one of said annular ends having a serrated circular peripheral edge with about 100 to about 150 serrations, a first locking mechanism shiftably mounted on said housing movable vertically in and out of frictional engagement with said tape, and a second locking mechanism shiftably mounted on said housing movable radially into and out of engagement with said serrated edges, said second locking mechanism having a plurality of said serrations thereon which when engaged with a plurality of serrations on at least one of said annular ends provides a positive lock for said tape coiled around said reel hub to prevent further withdrawal of the tape from said housing.

13. The retractable tape measure of claim 12, wherein said second locking mechanism is mounted above the axis of rotation of said reel.

14. The retractable tape measure of claim 12, wherein the serrations of said second locking mechanism are of the same size as the serrations on said one of said annular ends.

15. The retractable tape measure of claim 14, wherein at least three of said serrations of said one annular end and said second locking mechanism are in engagement when said second locking mechanism is in locked engagement with said serrations on said annular end.

16. The retractable tape measure of claim 12, wherein said first and second locking mechanisms are mounted on the front of said housing.

17. The retractable tape measure of claim 16, wherein said first and second locking mechanisms are provided with a common actuator for moving said first and second locking mechanisms between a disengaged position thereof wherein said first locking mechanism is out of engagement with said tape and said second locking mechanism serrations are out of engagement with said serrated edge and an engaged position wherein said first locking mechanism is in frictional engagement with said tape and said second locking mechanism serrations are engaged with said serrated edge to provide a positive lock.

18. The retractable tape measure of claim 17, wherein said common actuator has a position wherein said first locking mechanism is engaged to provide friction contact between said first locking mechanism and said tape and said second locking mechanism is disengaged.

19. The retractable tape measure of claim 17, wherein said common actuator carries first and second fixtures for respectively moving said first and second locking mechanisms between the engaged and disengaged positions thereof.

20. The retractable tape measure of claim 19, wherein said common actuator is slidably mounted on said housing front and said first and second fixtures extend into said housing for sliding engagement with said first and second locking mechanisms between the engaged and disengaged positions thereof.

* * * * *

UNITED STATES PATENT AND TRADEMARK OFFICE
CERTIFICATE OF CORRECTION

PATENT NO. : 5,400,521
DATED : March 28, 1995
INVENTOR(S) : Arthur Waldherr

It is certified that error appears in the above-indentified patent and that said Letters Patent is hereby corrected as shown below:

Claim 8, column 8, line 12, delete "6" and insert --13--.

Signed and Sealed this

Tenth Day of October, 1995

Attest:

BRUCE LEHMAN

Attesting Officer

Commissioner of Patents and Trademarks